United States Patent
Robins

[11] Patent Number: 6,058,883
[45] Date of Patent: May 9, 2000

[54] WASHABLE/REUSABLE ANIMAL BEDDING ELEMENT

[76] Inventor: Anna Robins, Nicoll Farm Stables, Allum Lane, Elstree, Borehamwood WD6 3NP, United Kingdom

[21] Appl. No.: 09/105,437

[22] Filed: Jun. 26, 1998

[51] Int. Cl.[7] .................................................. A01K 29/00
[52] U.S. Cl. ........................ 119/171; 119/526; 119/174; 428/375; 428/159
[58] Field of Search .................... 119/526, 171, 119/174, 709, 710; 428/375, 71, 158, 159, 397, 398, 373

[56] References Cited

U.S. PATENT DOCUMENTS

| | | | |
|---|---|---|---|
| 2,197,839 | 4/1940 | Roberts et al. | 114/219 |
| 2,757,423 | 8/1956 | Wurtz et al. | 428/71 |
| 2,772,194 | 11/1956 | Fisher et al. | 156/232 |
| 2,959,508 | 11/1960 | Graham et al. | 428/71 |
| 3,170,832 | 2/1965 | Wilson et al. | 428/159 |
| 3,403,070 | 9/1968 | Lewis, Jr. | 428/376 |
| 3,424,645 | 1/1969 | Ohsol | 428/376 |
| 3,795,722 | 3/1974 | Sassaman | 264/46.4 |
| 4,271,218 | 6/1981 | Heckel et al. | 138/141 |
| 4,442,174 | 4/1984 | Neumann et al. | 428/376 |
| 4,683,166 | 7/1987 | Yuto et al. | 428/314.8 |
| 4,711,811 | 12/1987 | Randa | 428/383 |
| 5,565,254 | 10/1996 | Norvell | 428/71 |
| 5,904,970 | 5/1999 | Lauer et al. | 428/71 |

FOREIGN PATENT DOCUMENTS

| | | | |
|---|---|---|---|
| 528660 | 2/1993 | European Pat. Off. | 119/171 |
| 2258990 | 3/1993 | United Kingdom . | |

*Primary Examiner*—Michael J. Carone
*Assistant Examiner*—James S. Bergin

[57] ABSTRACT

A new washable/reusable animal bedding element for laying on the floor of a stable for providing a comfortable and hygienic bedding for an animal. The inventive device includes a core having an outer surface and a pair of opposite ends. An outer sheath is disposed around the outer surface of the core between the ends of the core.

1 Claim, 2 Drawing Sheets

WASHABLE/REUSABLE ANIMAL BEDDING ELEMENT

BACKGROUND OF THE INVENTION

1. Field of the Invention

The present invention relates to animal bedding elements and more particularly pertains to a new washable/reusable animal bedding element for laying on the floor of a stable for providing a comfortable and hygienic bedding for an animal.

2. Description of the Prior Art

The use of animal bedding elements is known in the prior art. More specifically, animal bedding elements heretofore devised and utilized are known to consist basically of familiar, expected and obvious structural configurations, notwithstanding the myriad of designs encompassed by the crowded prior art which have been developed for the fulfillment of countless objectives and requirements.

Known prior art animal bedding elements include U.S. Pat. No. 5,152,251; U.S. Pat. No. 5,209,186; U.S. Pat. No. 4,364,331; U.S. Pat. No. 4,250,834; U.S. Pat. No. 5,136,981; and U.S. Pat. No. Des. 309,200.

While these devices fulfill their respective, particular objectives and requirements, the aforementioned patents do not disclose a new washable/reusable animal bedding element. The inventive device includes a core has an outer surface and a pair of opposite ends. An outer sheath is disposed around the outer surface of the core between the ends of the core.

In these respects, the washable/reusable animal bedding element according to the present invention substantially departs from the conventional concepts and designs of the prior art, and in so doing provides an apparatus primarily developed for the purpose of laying on the floor of a stable for providing a comfortable and hygienic bedding for an animal.

SUMMARY OF THE INVENTION

In view of the foregoing disadvantages inherent in the known types of animal bedding elements now present in the prior art, the present invention provides a new washable/reusable animal bedding element construction wherein the same can be utilized for laying on the floor of a stable for providing a comfortable and hygienic bedding for an animal.

The general purpose of the present invention, which will be described subsequently in greater detail, is to provide a new washable/reusable animal bedding element apparatus and method which has many of the advantages of the animal bedding elements mentioned heretofore and many novel features that result in a new washable/reusable animal bedding element which is not anticipated, rendered obvious, suggested, or even implied by any of the prior art animal bedding elements, either alone or in any combination thereof.

To attain this, the present invention generally comprises a core has an outer surface and a pair of opposite ends. An outer sheath is disposed around the outer surface of the core between the ends of the core.

There has thus been outlined, rather broadly, the more important features of the invention in order that the detailed description thereof that follows may be better understood, and in order that the present contribution to the art may be better appreciated. There are additional features of the invention that will be described hereinafter and which will form the subject matter of the claims appended hereto.

In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting.

As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

It is therefore an object of the present invention to provide a new washable/reusable animal bedding element apparatus and method which has many of the advantages of the animal bedding elements mentioned heretofore and many novel features that result in a new washable/reusable animal bedding element which is not anticipated, rendered obvious, suggested, or even implied by any of the prior art animal bedding elements, either alone or in any combination thereof.

It is another object of the present invention to provide a new washable/reusable animal bedding element which may be easily and efficiently manufactured and marketed.

It is a further object of the present invention to provide a new washable/reusable animal bedding element which is of a durable and reliable construction.

An even further object of the present invention is to provide a new washable/reusable animal bedding element which is susceptible of a low cost of manufacture with regard to both materials and labor, and which accordingly is then susceptible of low prices of sale to the consuming public, thereby making such washable/reusable animal bedding element economically available to the buying public.

Still yet another object of the present invention is to provide a new washable/reusable animal bedding element which provides in the apparatuses and methods of the prior art some of the advantages thereof, while simultaneously overcoming some of the disadvantages normally associated therewith.

Still another object of the present invention is to provide a new washable/reusable animal bedding element for laying on the floor of a stable for providing a comfortable and hygienic bedding for an animal.

Yet another object of the present invention is to provide a new washable/reusable animal bedding element which includes a core has an outer surface and a pair of opposite ends. An outer sheath is disposed around the outer surface of the core between the ends of the core.

Still yet another object of the present invention is to provide a new washable/reusable animal bedding element that is dust free and light in weight. Being dust free helps prevent respiratory problems from occurring in animals using the bedding.

Even still another object of the present invention is to provide a new washable/reusable animal bedding element that can be washed and disinfected so that is can be used over and over.

These together with other objects of the invention, along with the various features of novelty which characterize the invention, are pointed out with particularity in the claims annexed to and forming a part of this disclosure. For a better understanding of the invention, its operating advantages and the specific objects attained by its uses, reference should be made to the accompanying drawings and descriptive matter in which there are illustrated preferred embodiments of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

DESCRIPTION OF THE PREFERRED EMBODIMENT

Figure 1:
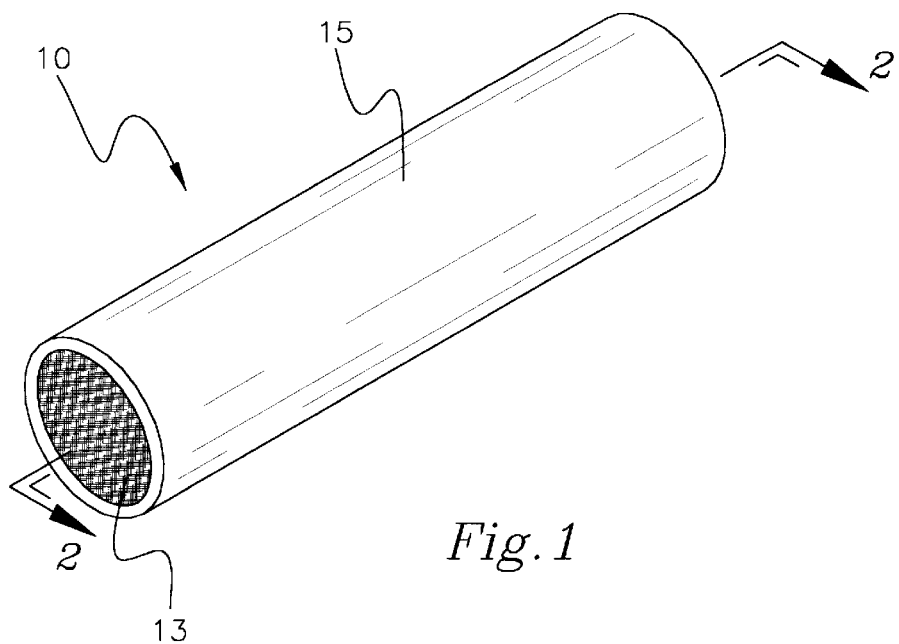
FIG. 1 is a schematic perspective view of a new washable/reusable animal bedding element according to the present invention.
Figure 2:
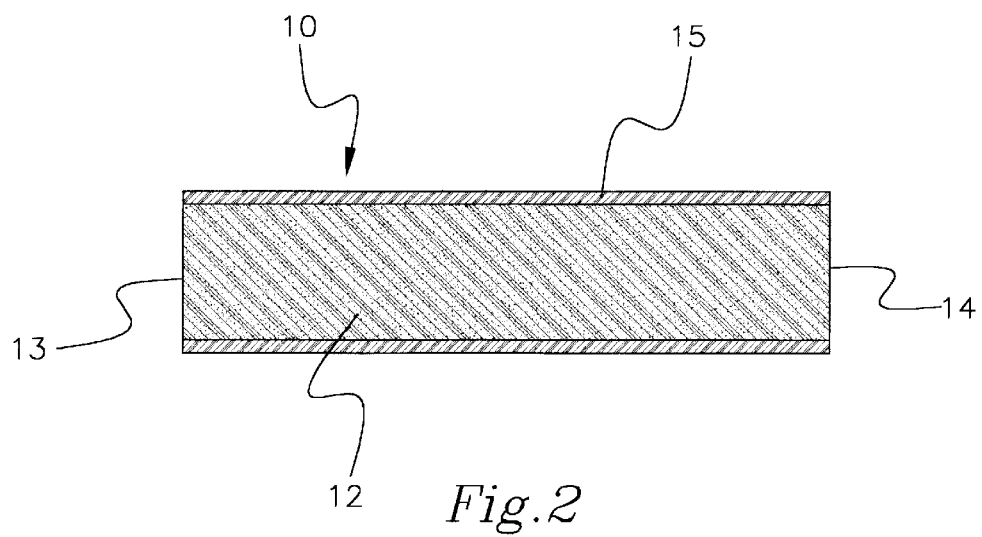
FIG. 2 is a schematic cross-sectional view of the present invention taken from line 2—2 of FIG. 1.
Figure 3:
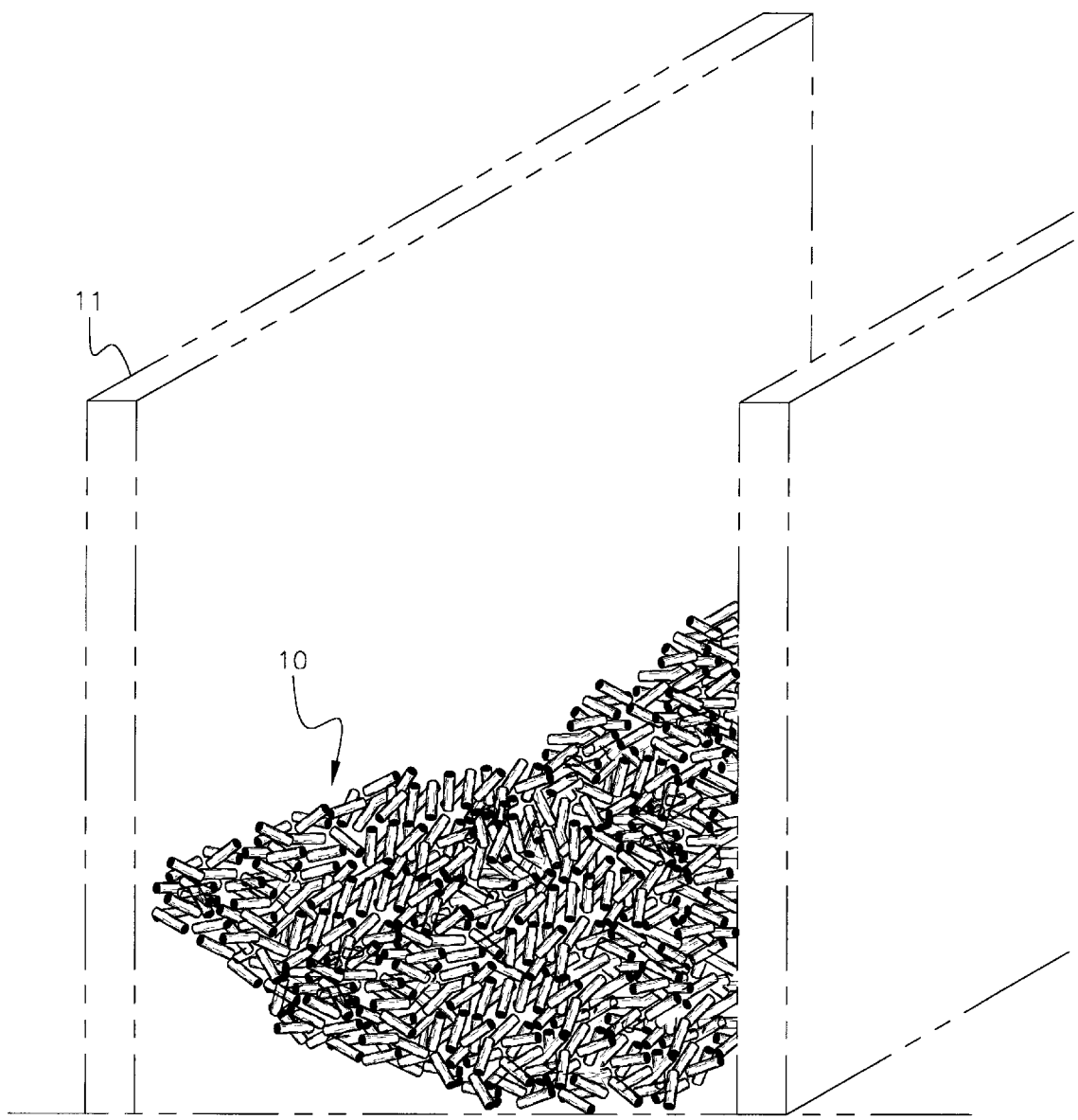
FIG. 3 is a schematic perspective view of several elements being used as bedding in a stable.

With reference now to the drawings, and in particular to FIGS. 1 through 3 thereof, a new washable/reusable animal bedding element embodying the principles and concepts of the present invention and generally designated by the reference numeral 10 will be described.

As illustrated in FIG. 3, in use the a animal bedding element is designed for laying on the floor surface of a stable 11 with a plurality of other elements to provide a bedding for an animal. As best illustrated in FIGS. 1 through 3, the washable/reusable animal bedding element 10 generally comprises a core 12 has an outer surface and a pair of opposite ends 13,14. An outer sheath 15 is disposed around the outer surface of the core 12 between the ends 13,14 of the core 12.

In closer detail, the core 12 is generally cylindrical and has an outer surface, and a pair of opposite generally circular ends 13,14. The core 12 has a diameter and a length defined between the ends 13,14 of the core 12. Preferably, the diameter of the core 12 is greater than about ½ inch and the length of the core 12 is greater than about 2 inches. Ideally, the diameter of the core 12 is about 1 inch and the length of the core 12 is about 4 inches. Preferably, the core 12 comprises a resiliently deformable foamed material (preferably synthetic) having open cells. This construction permits the core to serve as a soft and generally flexible bedding material.

The generally tubular outer sheath 15 is disposed around the outer surface of the core 12 between the ends 13,14 of the core 12. Preferably, the outer sheath 15 is coupled to the outer surface of the core 12, ideally by shrink-wrapping the sheath around the outer surface of the core 12. Preferably, the outer sheath 15 comprises a substantially water impermeable material (preferably a synthetic material) such that water cannot pass through the outer sheath 15. It is also preferred that the outer sheath 15 comprises a flexible material such that the outer sheath 15 may flex with the core 12 when the core 12 is deformed and so that the outer sheath 15 does not break when the core is deformed.

In use, a plurality of elements are spread on the floor structure of a stable. When the elements become dirty, the elements may be gathered and cleaned by washing and disinfected so that the elements may be reused as bedding.

As to a further discussion of the manner of usage and operation of the present invention, the same should be apparent from the above description. Accordingly, no further discussion relating to the manner of usage and operation will be provided.

With respect to the above description then, it is to be realized that the optimum dimensional relationships for the parts of the invention, to include variations in size, materials, shape, form, function and manner of operation, assembly and use, are deemed readily apparent and obvious to one skilled in the art, and all equivalent relationships to those illustrated in the drawings and described in the specification are intended to be encompassed by the present invention.

Therefore, the foregoing is considered as illustrative only of the principles of the invention. Further, since numerous modifications and changes will readily occur to those skilled in the art, it is not desired to limit the invention to the exact construction and operation shown and described, and accordingly, all suitable modifications and equivalents may be resorted to, falling within the scope of the invention.

I claim:

1. An animal bedding element for laying on the floor surface of a stable, comprising:

a core having an outer surface, and a pair of opposite ends;

an outer sheath being disposed around said outer surface of said core between said ends of said core;

wherein said core has a length defined between said ends of said core, and;

wherein said core is generally cylindrical, said ends of said core being generally circular;

wherein said length of said core is about 4 inches, and wherein a diameter of said core is about 1 inch;

wherein said core comprises a resiliently deformed material; and wherein said outer sheath comprises a substantially water impermeable material such that water cannot pass through said outer sheath.

* * * * *